(12) United States Patent
Li et al.

(10) Patent No.: US 10,170,265 B2
(45) Date of Patent: Jan. 1, 2019

(54) LEAKAGE CURRENT PROTECTION DEVICE

(71) Applicant: Chengli Li, Suzhou (CN)

(72) Inventors: Chengli Li, Suzhou (CN); Fei Lin, Suzhou (CN)

(73) Assignee: Chengli Li, Suzhou (CN)

(*) Notice: Subject to any disclaimer, the term of this patent is extended or adjusted under 35 U.S.C. 154(b) by 2 days.

(21) Appl. No.: 15/592,674

(22) Filed: May 11, 2017

(65) Prior Publication Data

US 2018/0166242 A1    Jun. 14, 2018

(30) Foreign Application Priority Data

Dec. 14, 2016  (CN) .......................... 2016 1 1156527
Dec. 14, 2016  (CN) .......................... 2016 2 1373486

(51) Int. Cl.
    *H01H 71/10*    (2006.01)
    *H01H 71/02*    (2006.01)
    *H01H 71/08*    (2006.01)
    *H01H 71/04*    (2006.01)

(52) U.S. Cl.
CPC ........ *H01H 71/10* (2013.01); *H01H 71/0264* (2013.01); *H01H 71/04* (2013.01); *H01H 71/08* (2013.01)

(58) Field of Classification Search
CPC ........ H01H 71/02; H01H 71/04; H01H 71/08; H01H 71/0264; H01H 71/10
USPC .......................................................... 335/18
See application file for complete search history.

(56) References Cited

U.S. PATENT DOCUMENTS

| | | | | |
|---|---|---|---|---|
| 4,001,647 A * | 1/1977 | Klein | ...................... | H01H 71/04 335/18 |
| 4,001,652 A * | 1/1977 | Klein | ...................... | H01H 83/04 335/18 |
| 4,010,432 A * | 3/1977 | Klein | ...................... | H01H 83/04 335/18 |
| 4,409,574 A * | 10/1983 | Misencik | ............... | H01H 83/04 335/18 |
| 7,414,499 B2 * | 8/2008 | Germain | ................ | H01H 83/04 335/18 |
| 9,036,320 B1 * | 5/2015 | Elberbaum | ............ | H01H 47/22 361/160 |
| 9,713,273 B2 * | 7/2017 | Li | ......................... | H05K 5/0213 |
| 9,876,345 B2 * | 1/2018 | Weeks | ................... | H02H 3/162 |
| 2003/0016477 A1 * | 1/2003 | Li | .......................... | H01H 83/04 361/42 |

(Continued)

*Primary Examiner* — Shawki S Ismail
*Assistant Examiner* — Lisa N Homza
(74) *Attorney, Agent, or Firm* — Chen Yoshimura LLP

(57) ABSTRACT

A leakage current protection device includes an electrical and mechanical assembly which includes: a circuit board; moving contact plates; an auxiliary switch; a reset shaft, having a hook in its lower portion, a bottom end of the reset shaft being set against one end of a reset spring, another end of the reset spring being set against the base; a disconnect mechanism, having a hook at its upper portion to engage with the hook of the reset shaft in a vertical direction; a trip coil and a trip plunger disposed on a side of the disconnect mechanism, where the disconnect mechanism is driven by the trip plunger to move horizontally. The disconnect mechanism further includes a pushing end that controls the auxiliary switch and lifting levers that control the moving contact plates.

10 Claims, 6 Drawing Sheets

(56) References Cited

U.S. PATENT DOCUMENTS

| | | | | |
|---|---|---|---|---|
| 2004/0027740 A1* | 2/2004 | Huang | ............... | H01H 83/04 |
| | | | | 361/42 |
| 2006/0061924 A1* | 3/2006 | Zhang | ............... | H01R 13/652 |
| | | | | 361/42 |
| 2008/0094764 A1* | 4/2008 | Zhang | ............... | H01R 13/665 |
| | | | | 361/42 |
| 2009/0184787 A1* | 7/2009 | Weeks | ............... | H01H 71/02 |
| | | | | 335/18 |
| 2010/0046128 A1* | 2/2010 | Wang | ............... | H01H 83/14 |
| | | | | 361/42 |
| 2012/0147570 A1* | 6/2012 | Yamazaki | ............ | H01H 13/705 |
| | | | | 361/748 |
| 2014/0140010 A1* | 5/2014 | Chan | ............... | H05K 7/209 |
| | | | | 361/714 |
| 2014/0177169 A1* | 6/2014 | Restrepo | ............ | H01R 13/6633 |
| | | | | 361/692 |
| 2014/0192492 A1* | 7/2014 | Wojcik | ............... | H05K 5/0086 |
| | | | | 361/752 |
| 2015/0116872 A1* | 4/2015 | Li | ............... | H02H 1/0015 |
| | | | | 361/42 |
| 2015/0200533 A1* | 7/2015 | Simonin | ............... | H02H 3/05 |
| | | | | 335/17 |
| 2015/0327380 A1* | 11/2015 | Li | ............... | H05K 5/0213 |
| | | | | 361/118 |
| 2017/0244237 A1* | 8/2017 | Weeks | ............... | H02H 3/162 |
| 2018/0145500 A1* | 5/2018 | Weeks | ............... | H01H 71/58 |
| 2018/0166833 A1* | 6/2018 | Nie | ............... | H01R 13/6683 |

* cited by examiner

LEAKAGE CURRENT PROTECTION DEVICE

BACKGROUND OF THE INVENTION

Field of the Invention

This invention relates to a leakage current protection device for electrical appliances.

Description of Related Art

Most small electrical appliances such as hair driers nowadays are provided with leakage current protection devices, so that when a current leakage occurs in the circuit, the user can be protected.

In conventional leakage current protection devices, problems often exist for the mechanical assembly of the device that present challenges for reliably achieving the tripping and reset processes.

Many products that are available on the market have complex structures or are not reliable.

SUMMARY

Accordingly, the present invention is directed to a leakage current protection device that substantially obviates one or more of the problems due to limitations and disadvantages of the related art. A leakage current protection device according to an embodiment of the present invention includes a top cover, a base, and an electrical and mechanical assembly disposed therein, the electrical and mechanical assembly including: a circuit board; one or more moving contact plates, for electrically connecting and disconnecting a load circuit; an auxiliary switch, for electrically connecting and disconnecting an auxiliary circuit; a reset shaft, wherein an upper portion of the reset shaft is configured to be connected to a reset button, a lower portion of the reset shaft includes a hook, a bottom end of the reset shaft is set against one end of a reset spring, and another end of the reset spring is set against the base; a disconnect mechanism, wherein an upper portion of the disconnect mechanism has a hook which is configured to be engageable in a vertical direction with the hook of the reset shaft; a trip coil and a trip plunger disposed in the trip coil, which are disposed on a side of the disconnect mechanism and controlled by electrical circuitry on the circuit board, wherein the disconnect mechanism is driven by the trip plunger to move horizontally to cause the hook of the reset shaft and the hook of the disconnect mechanism to disengage from each other, wherein the disconnect mechanism further includes a pushing end disposed at its top, and one or more lifting levers, wherein the pushing end of the disconnect mechanism controls the auxiliary switch and the one or more lifting levers control the one or more moving contact plates.

Preferably, the electrical and mechanical assembly further includes a trip spring, wherein one end of the trip spring is set against the trip plunger and another end of the trip spring is set against a stationary part of the electrical and mechanical assembly; wherein the disconnect mechanism has a slot near its center, the trip plunger has a neck portion at one end which fits into the slot, wherein the trip plunger and the disconnect mechanism engage with each other via the slot and the neck portion to move together horizontally.

Preferably, the pushing end of the disconnect mechanism is located below the auxiliary switch, wherein the one or more lifting levers of the disconnect mechanism are located respectively below the one or more moving contact plates, wherein when the pushing end of the disconnect mechanism pushes the auxiliary switch upwards, the auxiliary circuit is electrically connected, and when the pushing end is not in contact with the auxiliary switch, the auxiliary circuit is electrically disconnected, wherein when the one or more lifting levers of the disconnect mechanism push the one or more moving contact plates, the load circuit is electrically connected, and when the one or more lifting levers are not in contact with the one or more moving contact plates, the load circuit is electrically disconnected.

Preferably, the stationary contact of the auxiliary switch is affixed on the circuit board, another end of the auxiliary switch is affixed on the circuit board, and when the pushing end of the disconnect mechanism pushes upwards against the auxiliary switch, the moving contact of the auxiliary switch is in contact with the stationary contact of the auxiliary switch, whereby the auxiliary circuit is electrically connected; and wherein the leakage current protection device further comprises plug plates which pass through the base, and wherein when the one or more lifting levers of the disconnect mechanism push the one or more moving contact plates upwards, the one or more moving contact plates are in contact with the plug plates, whereby the load circuit is electrically connected.

Preferably, the end of the auxiliary switch that is not affixed to the circuit board has a cantilevered arm, where the moving contact of the auxiliary switch is disposed on an end of the cantilevered arm at a position that corresponds to the stationary contact of the auxiliary switch.

Preferably, the cantilevered arm of the auxiliary switch is resilient, and the moving contact of the auxiliary switch is disconnected from the stationary contact of the auxiliary switch when the cantilevered arm is in its free state.

Preferably, the one or more moving contact plates include a neutral line moving contact plate and a hot line moving contact plate, each having an electrical contact terminal, for contacting with and disconnecting from a hot line electrical contact on a hot line plug plate and a neutral line electrical contact on a neutral line plug plate, respectively.

Preferably, the neutral line moving contact plate and the hot line moving contact plate are resilient, and wherein in their free states, the electrical contact terminals of the hot line moving contact plate and the neutral line moving contact plate are respectively disconnected from the hot line electrical contact and the neutral line electrical contact.

In another aspect, the present invention provides a leakage current protection device, including: a top cover, a base, and an electrical and mechanical assembly disposed therein, the electrical and mechanical assembly including: a circuit board; a reset shaft; a reset button, wherein the reset shaft is fixedly connected to a reset button; and an indicator light; wherein the reset shaft includes a transparent indicator light guide plate in an upper portion, wherein when the reset button is pressed down, the indicator light guide plate is disposed to receive light emitted from the indicator light and guide the light along the indicator light guide plate, wherein the indicator light guide plate passes through the circuit board, and wherein a top portion of the indicator light guide plate is exposed through the reset button.

Preferably, the reset button includes an indicator light aperture, and wherein a head portion of the indicator light guide plate is disposed in the indicator light aperture.

Embodiments of the present invention can achieve the following technical effects: By the cooperation of hooks of the disconnect mechanism and reset shaft, the reset and trip processes can be reliably achieved. Further, by providing an indicator light guide plate and an indicator light aperture on the reset button, it enables the user to observe the light and be informed of the current state of the device.

DETAILED DESCRIPTION OF PREFERRED EMBODIMENTS

Figure 1:
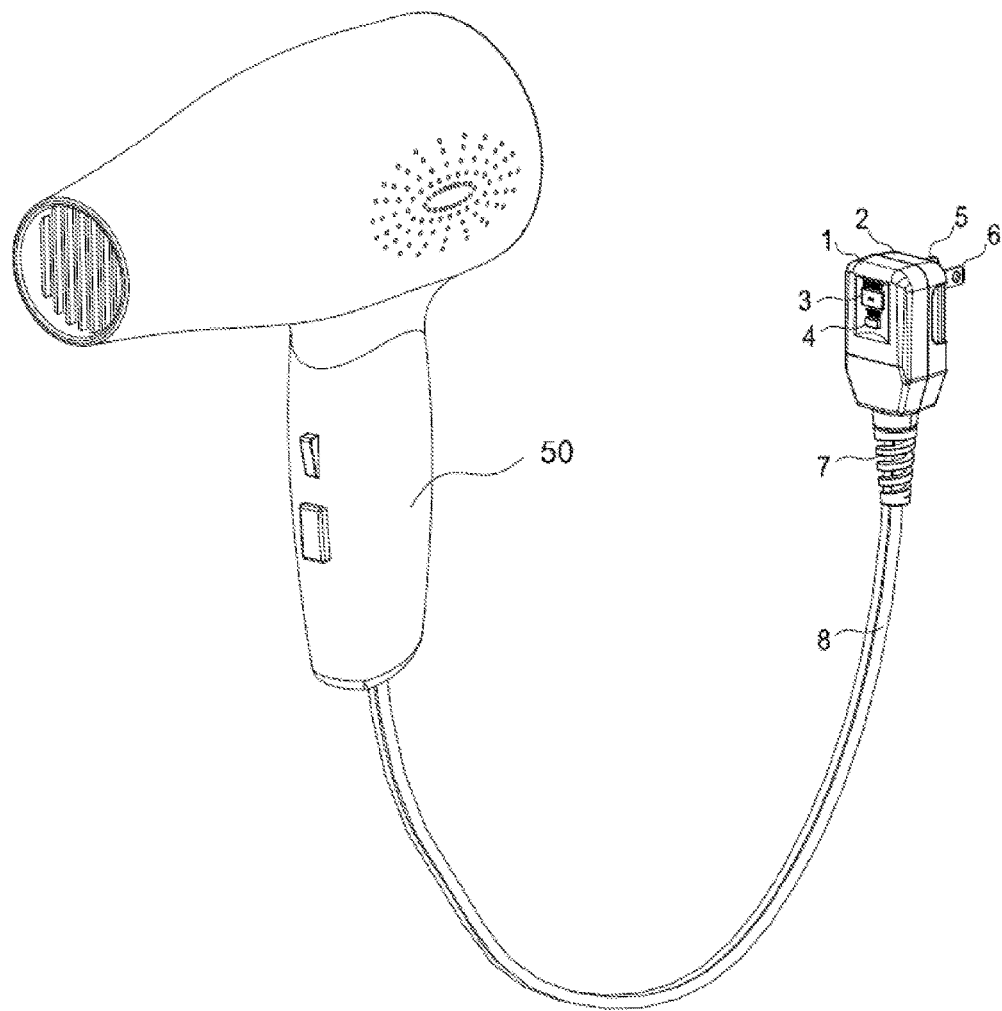
FIG. 1 illustrates a hair drier equipped with a leakage current protection device.

The reference symbols used in the various figures are as follows:
Top cover 1
Reset button aperture 101
Test button aperture 102
Base 2
Reset button 3
Indicator light aperture 301
Test button 4
Neutral line insertion plate 5
Neutral line electrical contact 501
Solder post 502
Hot line insertion plate 6
Hot line electrical contact 601
Solder post 602
Cable relief 7
Cable 8
Test spring 9
Circuit board 10
Reset guiding aperture 1001
Indicator light guide plate 11
Slanted end face 1101 of indicator light guide plate
Reset shaft 12
Hook of reset shaft 1201
Receiving slot 1202 on the reset shaft for receiving the indicator light guide plate
Indicator light 13
Reset spring 14
Trip coil 15
Trip plunger 16
Auxiliary switch 17
Moving contact 1701 of auxiliary switch
Stationary contact 18 of auxiliary switch
Disconnect mechanism 19
Lifting lever 1901 of the disconnect mechanism
Lifting lever 1902 of the disconnect mechanism
Hook 1903 of the disconnect mechanism
Pushing end 1904 of the disconnect mechanism
Neutral line moving contact plate 20
Electrical contact terminal 2001 of the neutral line moving contact plate
Soldering point 2002 of the neutral line moving contact plate
Hot line moving contact plate 21
Electrical contact terminal 2101 of the hot line moving contact plate
Soldering point 2102 of the hot line moving contact plate
Magnetic coil 22
Magnetic coil cover 23
Fastening screws 24
Trip spring 25
Electrical hair drier 50

Embodiments of the present invention are described with reference to the drawings. The drawings show specific embodiments which embody the present invention, but are not limiting. Other embodiments may be used. In the drawings, directional terms such as up, down, left, right, etc. refer to directions in the corresponding drawings, and they do not require particular absolute directions as the device may be used in any orientation. The embodiments described below are not limiting; it is intended that the present invention cover modifications and variations that come within the scope of the appended claims and their equivalents.

Leakage current protection devices according to embodiments of the present invention may be used with various electrical appliance as load. FIG. 1 shows an electrical hair drier 50 equipped with a leakage current protection device as an example.

Figure 3:
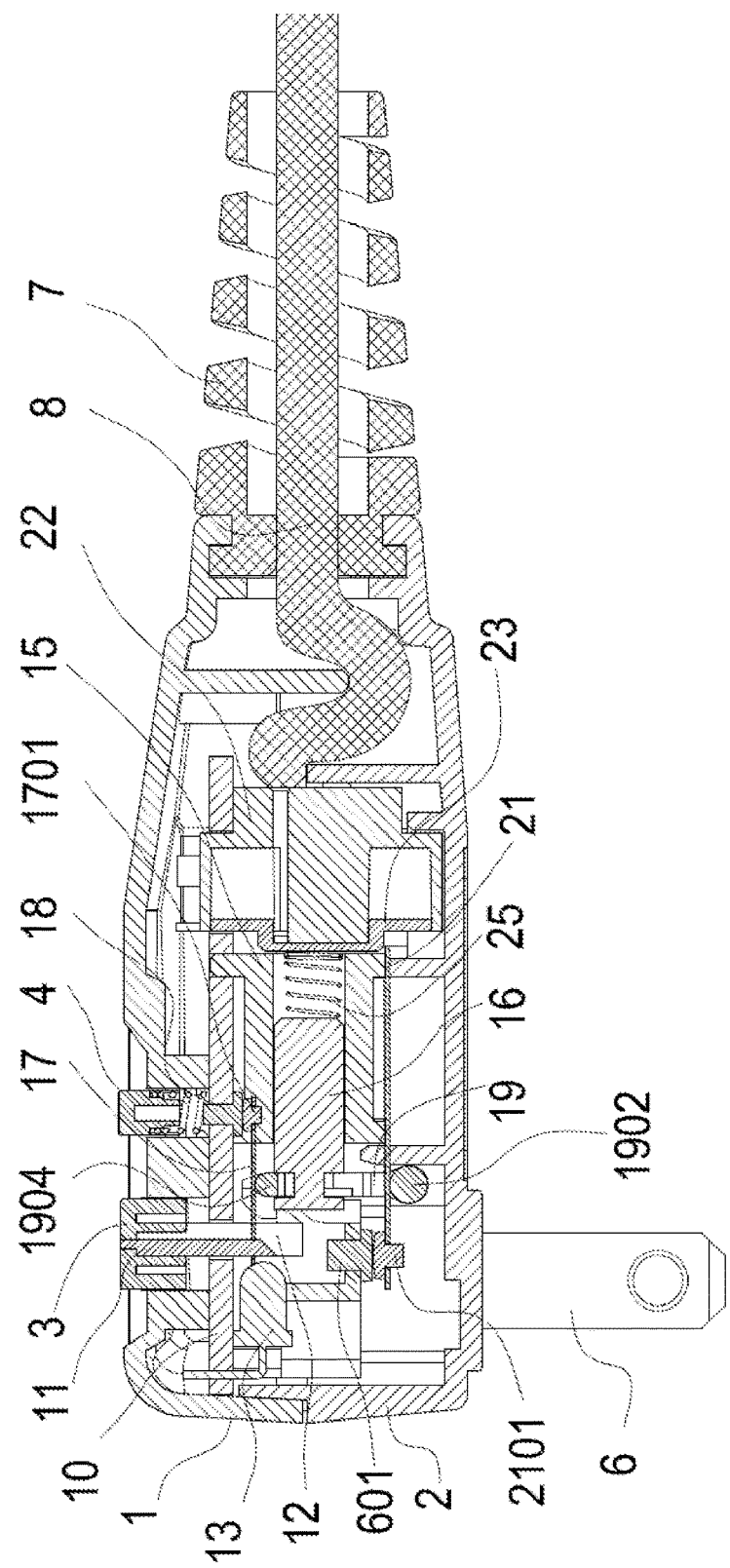
FIG. 3 is a side cross-sectional view showing the leakage current protection device of the present embodiment in a closed (connected) state.
Figure 4:
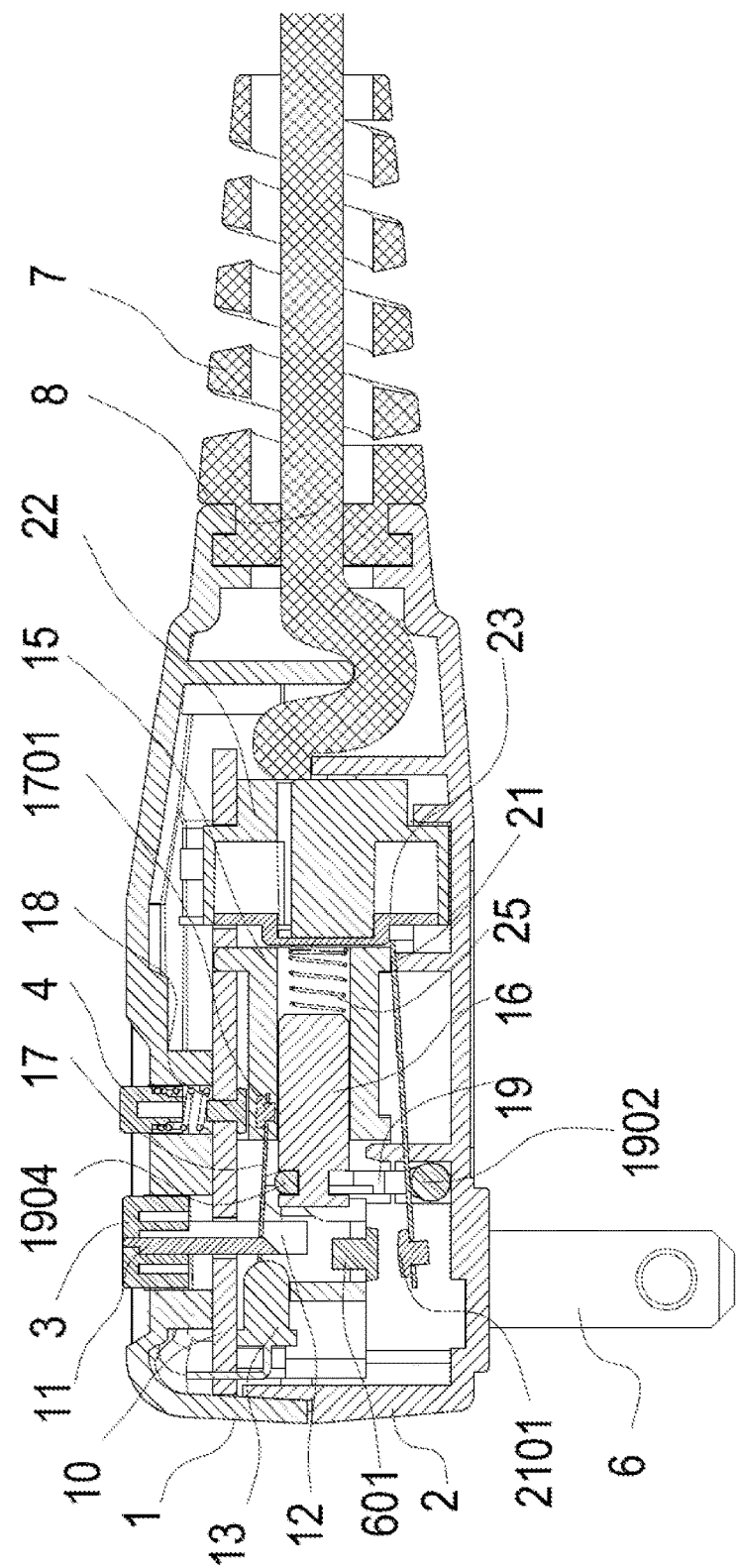
FIG. 4 is a side cross-sectional view showing the leakage current protection device of the present embodiment in an open (disconnected) state.
Figure 5:
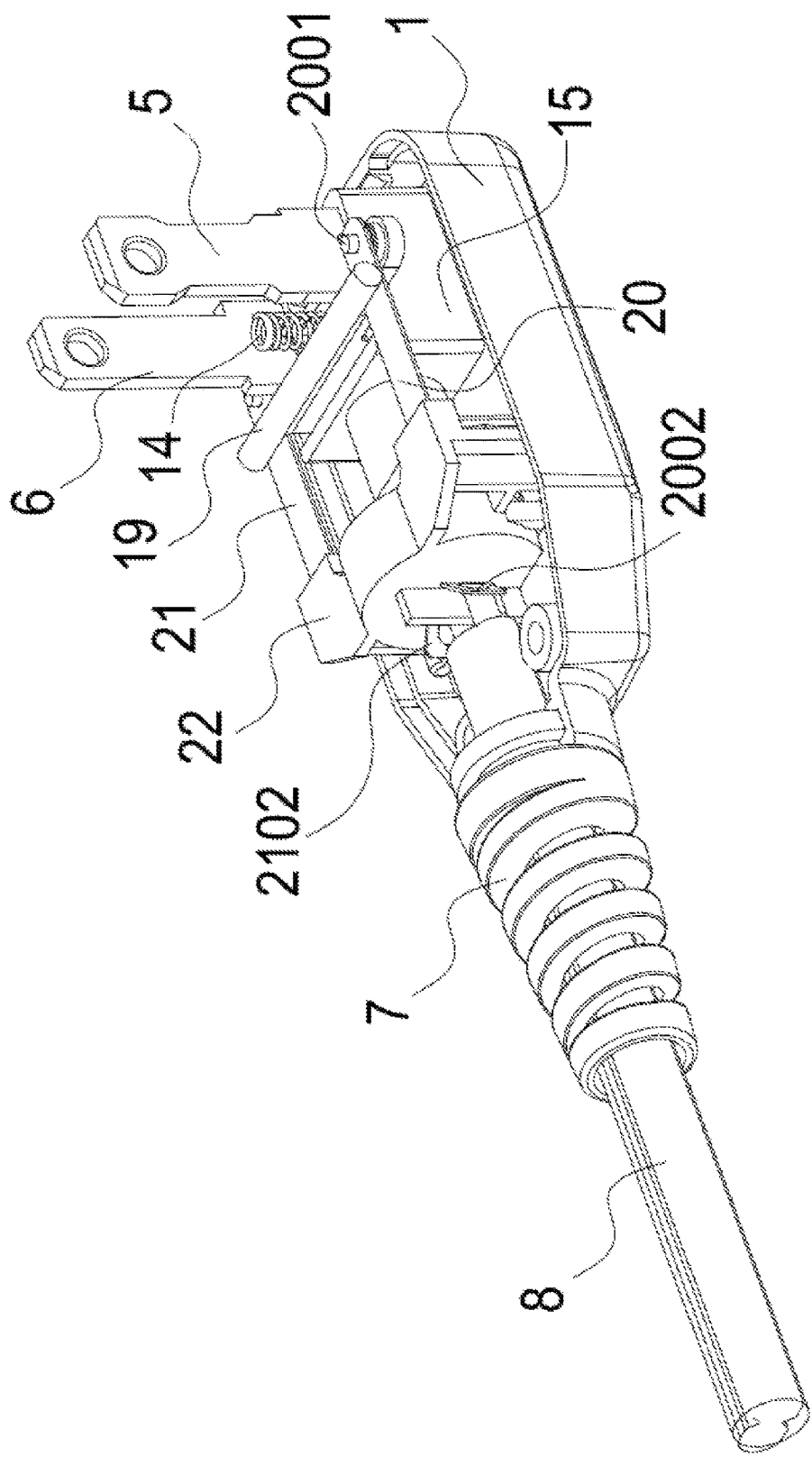
FIG. 5 is a perspective view of internal structures of the leakage current protection device of the present embodiment with the cover partly removed.
Figure 6:
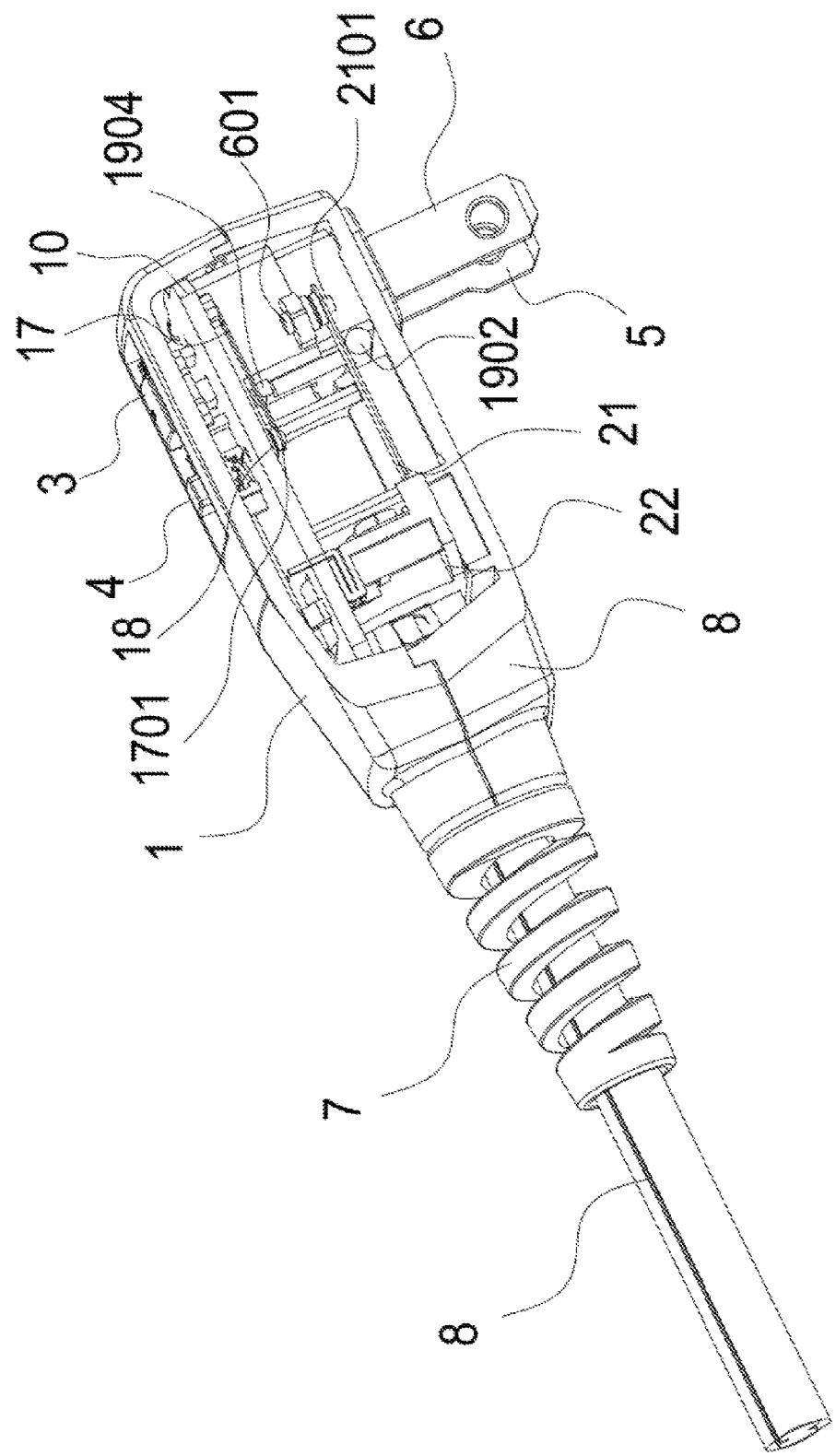
FIG. 6 is another perspective view of the internal structures of the leakage current protection device of the present embodiment with the cover partly removed.

The structure of the leakage current protection device is described below with reference to FIG. 2 which shows an exploded view, FIGS. 5 and 6 which show its internal structure with the cover partly removed, and FIGS. 3 and 4 which show the device in a closed (connected) and an open (disconnected) state, respectively.

Figure 2:
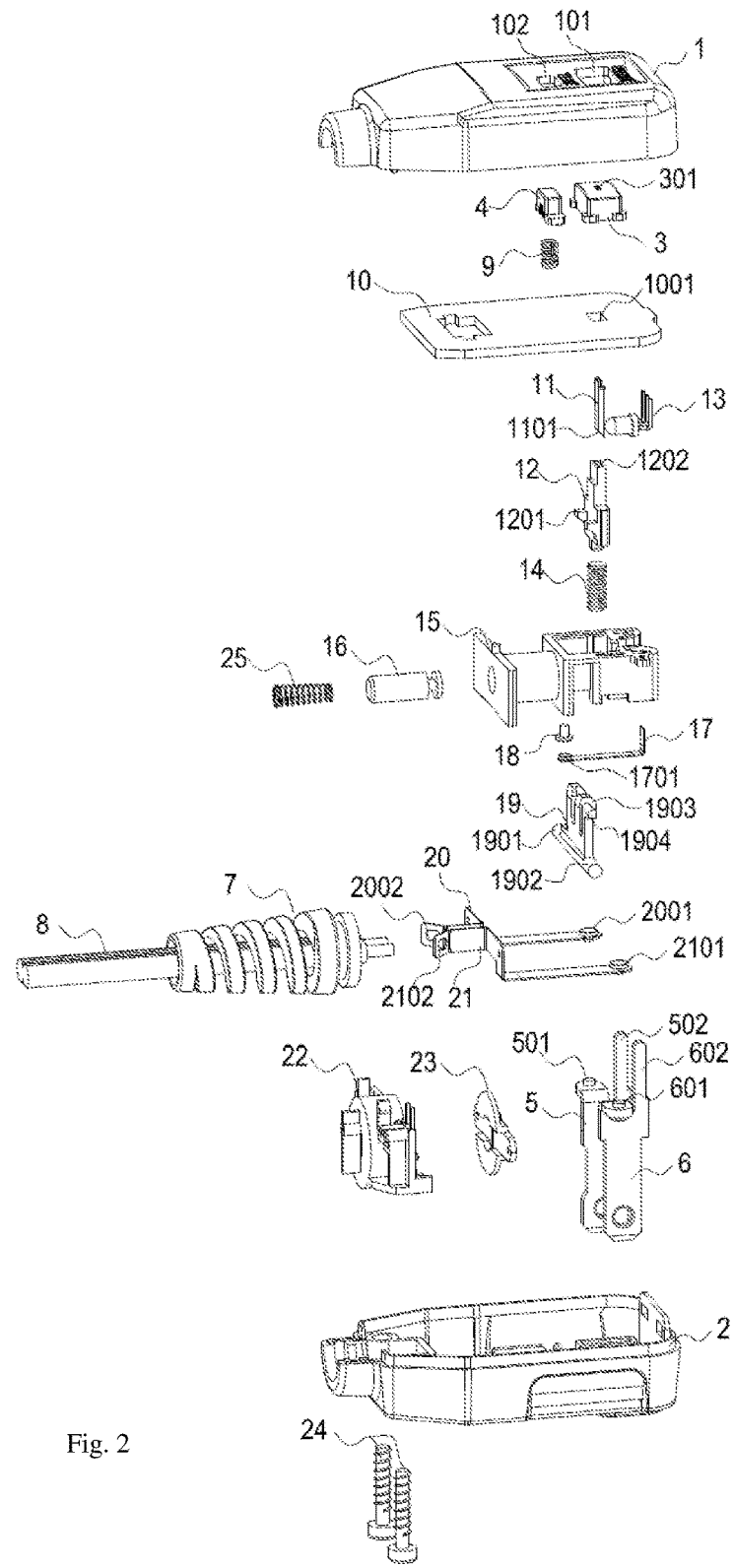
FIG. 2 is an exploded view showing components of a leakage current protection device according to an embodiment of the present invention.

As shown in FIGS. 1 and 2, the leakage current protection device according to an embodiment of the present invention includes a top cover 1, a base 2 and mechanical and electrical components disposed inside. As shown in FIG. 2, key characteristics of this embodiment are in the structures and spatial configurations of the reset shaft 12 and the disconnect mechanism 19.

As shown in FIG. 2, the circuit board 10 is provided with a reset guiding aperture 1001, such that the reset shaft 12 can pass through the reset guiding aperture 1001. The upper portion of the reset shaft 12 is fixedly connected to the reset button 3. Preferably, the upper portion of the reset shaft 12 is provided with a vertical transparent light guide plate 11 for the indicator light, and preferably, the indicator light guide plate 11 is located in a receiving slot 1202 on the reset shaft 12. The reset shaft 12 is fixedly connected to the reset button 3. The reset button 3 has an indicator light aperture 301, and the head portion of the indicator light guide plate 11 is disposed in the indicator light aperture 301 of the reset button 3. It should be noted that if the reset button 3 itself is transparent, then the indicator light aperture 301 is not necessary, as the user can directly observe the light below through the transparent reset button 3. This variation is within the scope of the invention. When the reset button 3 is pressed down, the body of the indicator light guide plate 11 can guide the light emitted by the indicator light 13; the indicator light guide plate 11 passes through the circuit board 10 (which is located between the reset button and the indicator light), so the user can observe the light guided by the indicator light guide plate 11. It should be noted that the light guiding function of the indicator light guide plate 11 may be realized in various ways. In a first example, shown in FIG. 2, the bottom face of the indicator light guide plate 11 is a slanted face 1101 (the angle relative to the vertical direction is preferably 45 degrees, but may be any angle between 30 and 60 degrees). This way, the light reflected by the slanted face 1101 can travel upwards inside the indicator light guide plate 11, so that the light is observable through the indicator light aperture 301 in the reset button 3. In a second example (not shown in the drawings), the light from the indicator light 13 has a slightly upward direction (e.g. 1 to 20 degrees), such that (even without a slanted end face) the light enters the indicator light guide plate 11 and is reflected multiple times by the vertical sidewalls of the indicator light guide plate 11 to travel upwards to reach the indicator light aperture 301 of the reset button 3, so as to be observable by the user. The above two examples are not limiting, and they can be combined, or other light guiding structure may be used which are also within the scope of this invention.

At a lower part of the reset shaft 12, a hook 1201 is provided. The bottom of the reset shaft 12 is set against one end of the reset spring 14, and another end of the reset spring 14 is set against the base 2.

As shown in FIG. 2, a hook 1903 is provided at an upper end of the disconnect mechanism 19, and this hook 1903 can engage the hook 1201 of the reset shaft 12 in the vertical direction. A trip coil 15 is disposed on one side of the disconnect mechanism 19, where the trip coil 15 has a trip plunger 16. Preferably, one end of the trip spring 25 is set against the trip plunger 16, and another end of the trip spring 25 is set against the magnetic coil cover 23. Regarding the position of the magnetic coil cover 23, referring to FIGS. 3 and 4, in fact, the magnetic coil cover 23 may be a suitable position of the top cover 1 or base 2, i.e., the other end of the trip spring 25 may be set against a place of the top cover 1 or the base 2. As seen in FIG. base 2, preferably, the disconnect mechanism 19 has a U shaped slot at the center, and the end of the trip plunger 16 that engages the disconnect mechanism 19 has a neck portion, where the neck portion of the trip plunger 16 fits into the U shaped slot of the disconnect mechanism 19, so that the trip plunger 16 and the disconnect mechanism 19 move together in the horizontal direction. A circuit is provide on the circuit board 10, which can control the current flowing through the trip coil 15, causing the trip plunger 16 to move horizontally. This causes the disconnect mechanism 19 to move horizontally, which in turn causes the hook 1201 of the reset shaft to be disengaged with the hook 1903 of the disconnect mechanism. It should be understood here that "to move horizontally" has a broad meaning here; for example, when moving in the horizontal direction, the disconnect mechanism 19 may rotate slightly, and such a movement is within the meaning of "to move horizontally" as used in this disclosure.

As shown in FIG. 2, a stationary contact 18 for the auxiliary switch is disposed on the circuit board 10, and one end of the auxiliary switch (arm) 17 is also fixedly disposed on the circuit board 10. Preferably, the other end of the auxiliary switch 17 that is not fixedly disposed on the circuit board 10 is a cantilevered arm, and a moving contact 1701 of the auxiliary switch is disposed at the end of the cantilevered arm, where the moving contact 1701 cooperates in position with the stationary contact 18 of the auxiliary switch. The cantilevered arm of the auxiliary switch 17 is resilient, and in its free state, the moving contact 1701 of the auxiliary switch is disconnected from the stationary contact 18 of the auxiliary switch.

Refer to FIG. 2, as well as FIGS. 4, 5 and 6, the disconnect mechanism 19 has a pushing end 1904 at one side of its upper portion, where the pushing end 1904 is located below the auxiliary switch 17. When the pushing end 1904 moves upwards against the auxiliary switch (arm) 17, the moving contact 1701 of the auxiliary switch contacts the stationary contact 18 of the auxiliary switch, so the auxiliary switch circuit is connected (i.e. switch is closed). When the pushing end 1904 of the disconnect mechanism does not contact the auxiliary switch 17, the auxiliary switch circuit is not connected (i.e. switch is open). At a lower portion of the disconnect mechanism 19, on both sides, lifting levers 1901 and 1902 are provided, where the lifting levers 1901 and 1902 are respectively located below the hot line moving contact plate 21 and the neutral line moving contact plate 20. When the lifting lever 1901 and 1902 of the disconnect mechanism move upwards to push against the hot line moving contact plate 21 and the neutral line moving contact plate 20, respectively, the electrical contact terminal 2101 of the hot line moving contact plate and the electrical contact terminal 2001 of the neutral line moving contact plate respectively contact the hot line electrical contact 601 of the hot line insertion plate 6 and the neutral line electrical contact 501 of the neutral line insertion plate 5, so that the electrical circuit to the load is connected. The hot line moving contact plate 21 and the neutral line moving contact plate 20 are both resilient, so that in their free states, the electrical contact terminal 2101 of the hot line moving contact plate and the electrical contact terminal 2001 of the neutral line moving contact plate are respectively disconnected from the hot line electrical contact 601 and the neutral line electrical contact 501, i.e., the load circuit is disconnected.

It should be pointed out that in preferred embodiments of the present invention, lifting levers 1901 and 1902 of the disconnect mechanism are simultaneously provided for the hot and neutral lines, respectively, and they respectively correspond to the hot line moving contact plate 21 and neutral line moving contact plate 20. In practice, it is also possible to provide only one lifting lever for only the hot line or only the neutral line, and provide only one moving contact plate for only the hot line or only the neutral line. This alternative is within the scope of this invention The structure and spatial configuration of the reset shaft 12 and disconnect mechanism 19 are describe above; below, the working principle of the leakage current protection device according to embodiments of the present invention is described, with references to FIGS. 2, 3 and 4, as well as FIGS. 5 and 6. When viewing the drawings, it should be noted that the left-right directions of FIGS. 3 and 4 are the opposite of that of FIG. 2, and that in FIG. 5 the top cover is at the lower position to better illustrate the internal structures.

First, the reset principle and process of the leakage current protection device are described. As shown in FIGS. 2, 3 and 4, when the plug is plugged into the power outlet, and the reset button 3 is pressed down, because the reset shaft 12 is connected to the reset button 3, the reset shaft 12 moves down. When it moves down to a predetermine position, the hook 1201 of the reset shaft 12 can engage the hook 1903 of the disconnect mechanism 19. As seen in FIG. 2, the hook 1201 has a slanted bottom face, and its recessed part is a level (up-facing) hook surface. Correspondingly, the top face of the hook 1903 of the disconnect mechanism is also a slanted face, and its recessed part is also a level (down-facing) hook surface. Thus, when either or both of the reset shaft 12 and the disconnect mechanism 19 has a degree of resilience, the two slanted faces can slide along each other, until the two level hook surfaces are engaged with each other. At this time, the reset shaft 12 and the disconnect mechanism 19 return to the vertical position due to resiliency. Meanwhile, because the trip spring 25 is always set against the trip plunger 16, and the trip plunger 16 moves horizontally to the right along with the disconnect mechanism 19, the hook 1903 of the disconnect mechanism and the hook 1201 of the reset shaft can stay engaged with each other. At this time, under the force of the reset spring 14, the reset shaft 12 is pushed upwards by the reset spring 14, so as to pull the disconnect mechanism 19 upwards with it. The lifting levers 1901 and 1902 of the disconnect mechanism in turn respectively lift the neutral line moving contact plate 20 and the hot line moving contact plate 21 upwards with them, until the electrical contact terminal 2001 of the neutral line moving contact plate 20 and the electrical contact terminal 2101 of the hot line moving contact plate 21 come into contact respectively with the neutral line electrical contact 501 and the hot line electrical contact 601. This completes the electrical connection of the circuit, i.e., the state of the device changes from that of FIG. 4 to that of FIG. 3. Also, the reset operation also includes making electrical connection in an auxiliary circuit, where one end of the auxiliary switch 17 (contact arm) is soldered onto the circuit board 10, and its other end has an auxiliary switch moving contact 1701, and where the stationary contact 18 of the auxiliary switch is soldered on the circuit board 10 and electrically connected to the electrical circuit on the circuit board. When the disconnect mechanism 19 moves upward, the pushing end 1904 of the disconnect mechanism pushes the moving arm of the auxiliary switch 17 upward, so that the moving contact 1701 of the auxiliary switch comes into contact with the stationary contact 18 of the auxiliary switch, thereby completing the electrical connection of the auxiliary switching circuit.

It should be noted that when the reset button 3 is maintained at the pressed down position, the light emitted by the indicator light 13 is incident on the slanted end face 1101 of the indicator light guiding plate 11, so that the light is reflected and travels upwards along the indicator light guide plate 11. It should be understood that here, the alternative structure of the indicator light guide plate (not shown in the drawings) functions similarly, i.e. it guides the light to travel upwards. Because the reset button 3 has an indicator light aperture 301 and the heap portion of the indicator light guide plate 11 is located in the indicator light aperture 301, the user can observe the light manually. When the reset button 3 is pressed down to reset the device, or when the device is malfunctioning, the indicator light 13 will emit different colored light; the light is guided by the indicator light guide plate 11 to the face of the reset button, so as to inform the user of the current state of the device.

Next, the tripping principle and process of the leakage current protection device are described. Ash sown in FIGS. 2, 3 and 4, when the test button 4 is pressed down, a test circuit generates a simulated leakage current. This leakage current is detected by the magnetic coil 22 and processed by the IC to output a signal for controlling a switch which is preferably a silicon-controlled rectifier (SCR). Under this control signal, the SCR becomes conductive, causing the trip coil 15 to be energized. As shown in FIG. 4, this causes the trip plunger 16 to move to the right (which is left in the orientation of FIG. 2), pulling the disconnect mechanism 19 away from the reset shaft 12 so that the hook 1903 of the disconnect mechanism is disengaged from the hook 1201 of the reset shaft. After the disengagement, the reset shaft 12 jumps upwards under the force of the reset spring 14, and the disconnect mechanism 19 moved downwards quickly under the resilient forces of the neutral line moving contact plate 20 and the hot line moving contact plate 21. FIG. 4 shows a state where the neutral line moving contact plate 20 and the hot line moving contact plate 21 are in their respective free state. Because FIG. 4 is a side view, only the hot line moving contact plate 21 is visible. In such a state, the electrical contact terminal 2001 of the neutral line moving contact plate and the electrical contact terminal 2101 of the hot line moving contact plate are respectively disconnected from the neutral line electrical contact 501 and the hot line electrical contact 601, which completes the electrical disconnection of the load. Meanwhile, for the moving arm of the auxiliary switch 17, because the force by the pushing end 1904 of the disconnect mechanism is no longer present, the moving arm returns to its free state and disconnects the electrical connection between the moving contact 1701 and the stationary contact 18 of the auxiliary switch. In FIG. 4, the moving arm of the auxiliary switch 17 is in its free state.

Embodiments of the present invention have the following technical effects: By the cooperation of the hooks of the disconnect mechanism and reset shaft, the reset and trip processes can be reliably achieved. Further, the indicator light guide plate and the indicator light aperture on the reset button enable the user to observe the light and be informed of the current state of the device.

It will be apparent to those skilled in the art that various modification and variations can be made in the leakage current protection device of the present invention without departing from the spirit or scope of the invention. Thus, it is intended that the present invention cover modifications and variations that come within the scope of the appended claims and their equivalents.

What is claimed is:

1. A leakage current protection device, comprising:
a top cover, a base, and an electrical and mechanical assembly disposed therein, the electrical and mechanical assembly comprising:
a circuit board;
one or more moving contact plates, for electrically connecting and disconnecting a load circuit;
an auxiliary switch, for electrically connecting and disconnecting an auxiliary circuit;
a reset shaft, wherein an upper portion of the reset shaft is configured to be connected to a reset button, a lower portion of the reset shaft includes a hook, a bottom end of the reset shaft is set against one end of a reset spring, and another end of the reset spring is set against the base;
a disconnect mechanism, wherein an upper portion of the disconnect mechanism has a hook which is configured to be engageable in a vertical direction with the hook of the reset shaft;
a trip coil and a trip plunger disposed in the trip coil, which are disposed on a side of the disconnect mechanism and controlled by electrical circuitry on the circuit board,
wherein the disconnect mechanism is driven by the trip plunger to move horizontally to cause the hook of the reset shaft and the hook of the disconnect mechanism to disengage from each other,
wherein the disconnect mechanism further includes a pushing end disposed at its top, and one or more lifting levers, wherein the pushing end of the disconnect mechanism controls the auxiliary switch and the one or more lifting levers control the one or more moving contact plates.

2. The leakage current protection device of claim 1, wherein the electrical and mechanical assembly further comprises a trip spring, wherein one end of the trip spring is set against the trip plunger and another end of the trip spring is set against a stationary part of the electrical and mechanical assembly;

wherein the disconnect mechanism has a slot near its center, the trip plunger has a neck portion at one end which fits into the slot, wherein the trip plunger and the disconnect mechanism engage with each other via the slot and the neck portion to move together horizontally.

3. The leakage current protection device of claim 1, wherein the pushing end of the disconnect mechanism is located below the auxiliary switch, wherein the one or more lifting levers of the disconnect mechanism are located respectively below the one or more moving contact plates, wherein when the pushing end of the disconnect mechanism pushes the auxiliary switch upwards, the auxiliary circuit is electrically connected, and when the pushing end is not in contact with the auxiliary switch, the auxiliary circuit is electrically disconnected, wherein when the one or more lifting levers of the disconnect mechanism push the one or more moving contact plates, the load circuit is electrically connected, and when the one or more lifting levers are not in contact with the one or more moving contact plates, the load circuit is electrically disconnected.

4. The leakage current protection device of claim 3, wherein the stationary contact of the auxiliary switch is affixed on the circuit board, another end of the auxiliary switch is affixed on the circuit board, and when the pushing end of the disconnect mechanism pushes upwards against the auxiliary switch, the moving contact of the auxiliary switch is in contact with the stationary contact of the auxiliary switch, whereby the auxiliary circuit is electrically connected; and wherein the leakage current protection device further comprises plug plates which pass through the base, and wherein when the one or more lifting levers of the disconnect mechanism push the one or more moving contact plates upwards, the one or more moving contact plates are in contact with the plug plates, whereby the load circuit is electrically connected.

5. The leakage current protection device of claim 4, wherein the end of the auxiliary switch that is not affixed to the circuit board has a cantilevered arm, where the moving contact of the auxiliary switch is disposed on an end of the cantilevered arm at a position that corresponds to the stationary contact of the auxiliary switch.

6. The leakage current protection device of claim 5, wherein the cantilevered arm of the auxiliary switch is resilient, and the moving contact of the auxiliary switch is disconnected from the stationary contact of the auxiliary switch when the cantilevered arm is in its free state.

7. The leakage current protection device of claim 1, wherein the one or more moving contact plates include a neutral line moving contact plate and a hot line moving contact plate, each having an electrical contact terminal, for contacting with and disconnecting from a hot line electrical contact on a hot line plug plate and a neutral line electrical contact on a neutral line plug plate, respectively.

8. The leakage current protection device of claim 7, wherein the neutral line moving contact plate and the hot line moving contact plate are resilient, and wherein in their free states, the electrical contact terminals of the hot line moving contact plate and the neutral line moving contact plate are respectively disconnected from the hot line electrical contact and the neutral line electrical contact.

9. The leakage current protection device of claim 1, further comprising:

an indicator light;

wherein the reset shaft includes a transparent indicator light guide plate in the upper portion, wherein when the reset button is pressed down, the indicator light guide plate is disposed to receive light emitted from the indicator light and guide the light along the indicator light guide plate, wherein the indicator light guide plate passes through the circuit board, and wherein a top portion of the indicator light guide plate is exposed through the reset button.

10. The leakage current protection device of claim 9, wherein the reset button includes an indicator light aperture, and wherein a head portion of the indicator light guide plate is disposed in the indicator light aperture.

* * * * *